US010568330B2

(12) United States Patent
Levy

(10) Patent No.: US 10,568,330 B2
(45) Date of Patent: Feb. 25, 2020

(54) CUPCAKE AND MUFFIN PAN

(71) Applicant: Gotham Steel LLC, Northvale, NJ (US)

(72) Inventor: Marvin Levy, Montvale, NJ (US)

(*) Notice: Subject to any disclaimer, the term of this patent is extended or adjusted under 35 U.S.C. 154(b) by 0 days.

(21) Appl. No.: 15/886,444

(22) Filed: Feb. 1, 2018

(65) Prior Publication Data
US 2019/0082700 A1 Mar. 21, 2019

Related U.S. Application Data

(63) Continuation of application No. 29/618,101, filed on Sep. 19, 2017.

(51) Int. Cl.
A21B 3/13 (2006.01)

(52) U.S. Cl.
CPC .............. A21B 3/132 (2013.01); A21B 3/135 (2013.01); A21B 3/137 (2013.01)

(58) Field of Classification Search
CPC .......... A21B 3/132; A21B 3/137; A21B 3/135
USPC ......... 99/426, 427, 430, 431, 432, 433, 439, 99/428, 440–442; 249/203; 426/389
See application file for complete search history.

(56) References Cited

U.S. PATENT DOCUMENTS

| | | | | |
|---|---|---|---|---|
| 4,052,034 A | * | 10/1977 | Marceno | A21B 3/13 249/110 |
| 2002/0078833 A1 | * | 6/2002 | Sloan | A21B 3/132 99/426 |
| 2006/0272461 A1 | * | 12/2006 | Atwater | A21C 11/106 83/13 |
| 2014/0017371 A1 | * | 1/2014 | Gattineri | A47J 37/01 426/389 |
| 2014/0065273 A1 | * | 3/2014 | Krupa | A47J 37/01 426/393 |
| 2015/0069215 A1 | * | 3/2015 | Kohnen | A21B 3/13 249/203 |

OTHER PUBLICATIONS

Merriam-Webster, definition of "cap."*

* cited by examiner

Primary Examiner — Michael G Hoang
(74) Attorney, Agent, or Firm — Antonio Papageorgiou; Meister Seelig & Fein LLP

(57) ABSTRACT

A baking pan for cooking a plurality of cupcakes or muffins is provided, the pan including a first portion and a second portion separable from the first, where the first portion represents a form for at least half of the sidewalls of the cupcakes or muffins, and where the second portion represents a form for at least part of the sidewalls not formed by the first portion and for the bottoms of the cupcakes or muffins.

15 Claims, 6 Drawing Sheets

CUPCAKE AND MUFFIN PAN

RELATED APPLICATION

This application is a continuation of U.S. application Ser. No. 29/618,101, filed Sep. 19, 2017, which is hereby incorporated herein by reference.

BACKGROUND OF THE INVENTION

The present application relates to cooking pans and more particularly pans for baking cupcakes, muffins, and the like.

Baking certain food items, such as cupcakes and muffins, can be a difficult endeavor. There exist specialized different cupcake and muffin pans, which generally include a matrix of cups that form individual cupcakes or muffins. With these pans, however, it may be difficult to remove the cupcake or muffin from the cups once the baking is complete. Accordingly, there is a need for a pan that is not so limited.

SUMMARY OF THE INVENTION

A baking pan for cooking a plurality of cupcakes or muffins is provided, the cupcakes/muffins having sidewalls and bottoms, the pan including a first portion and a second portion separable from the first, where the first portion represents a form for at least half of the sidewalls of the cupcakes or muffins, and where the second portion represents a form for at least part of the sidewalls not formed by the first portion and for the bottoms of the cupcakes or muffins.

In at least one embodiment, the pan forms at least 2×3 cupcakes or muffins.

In at least one embodiment, the pan includes a plurality of corner cups and a plurality of interior cups located between corner cups.

In at least one embodiment, the first portion includes a first curved portion representing sidewalls for a first corner cup, followed by a second curved section representing sidewalls for a first interior cup, followed by a third curved section representing sidewalls for a second corner cup.

In at least one embodiment, the first and third curved sections have a circular arc that measures about 180 degrees.

In at least one embodiment, the second curved section has a circular arc that measures about 90 degrees.

In at least one embodiment, first and third curves sections represent the form for about half of the sidewalls of a plurality of cupcakes or muffins, and where the second section represents the form for about a quarter of the sidewalls of at least one cupcake or muffin.

In at least one embodiment, the first portion includes a flange on which the second portion rests for baking.

In at least one embodiment, the pan includes a curved transition between sidewalls and the flange of the first portion.

In at least one embodiment, the second portion comprises a plate representing a form for the bottoms of the cupcakes or muffins.

In at least one embodiment, the second portion comprises a plurality of dividers extending outward from the plate, where the dividers represent the form for the sidewalls of the cupcakes or muffins.

In at least one embodiment, about half of the sidewalls of corner cupcake or muffin are formed with the second portion, and where about three quarters of the sidewalls of interior cupcakes or muffins are formed by the second portion.

In at least one embodiment, the second portion comprises at least one cap that closes tops of the dividers.

In at least one embodiment, the dividers comprise a plurality of sheets of material extending from the plate representing the form for the bottoms of the cupcakes or muffins, the plurality of sheets secured to each other at tops thereof with at least one cap.

In at least one embodiment, the plate has therein an aperture at the location of at least one of the dividers.

Additional aspects of the present invention will be apparent in view of the description which follows.

DETAILED DESCRIPTION OF THE INVENTION

Figure 1:
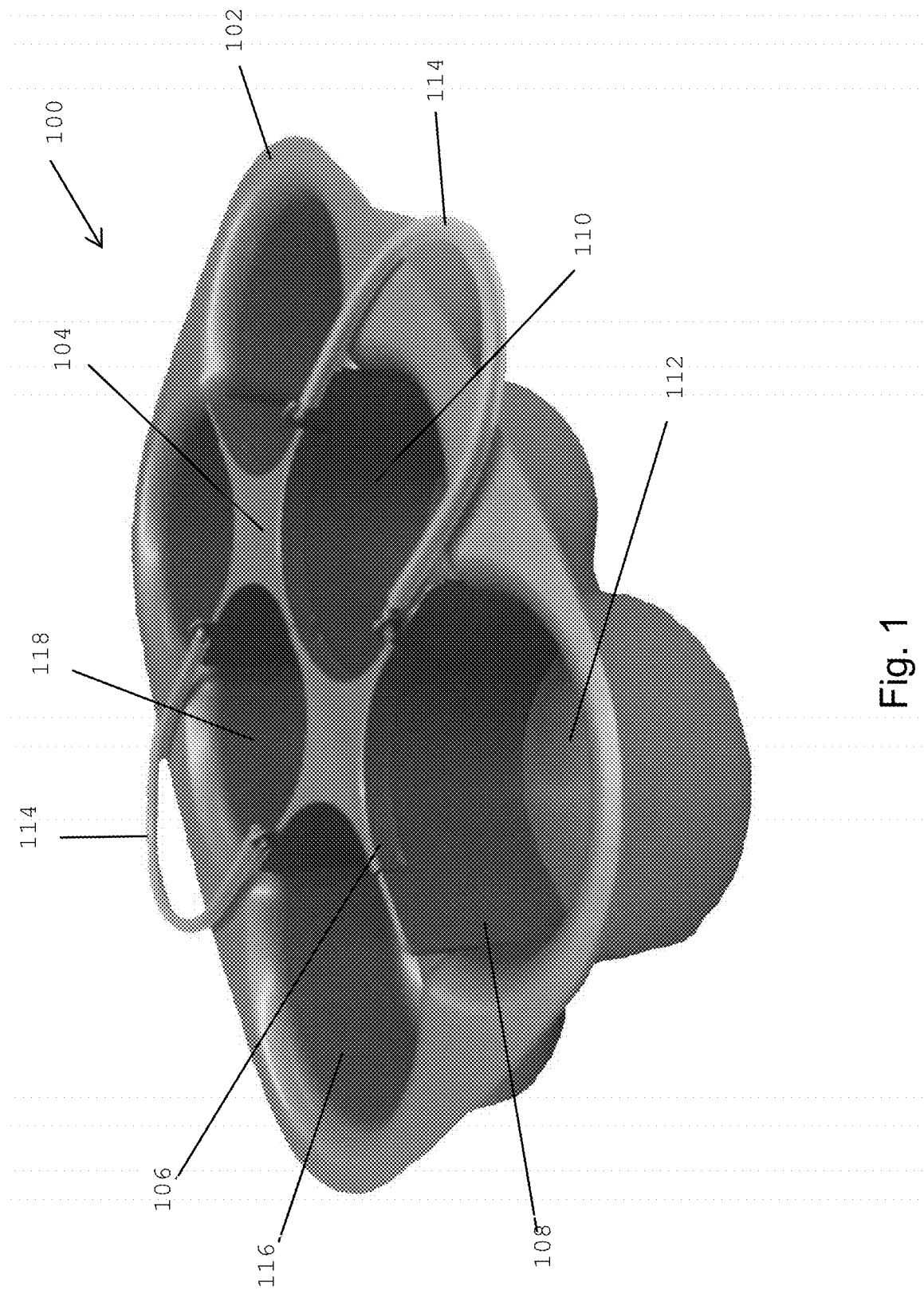
FIG. 1 is a perspective view of a cupcake/muffin pan according to one embodiment of the pans disclosed herein.
Figure 2:
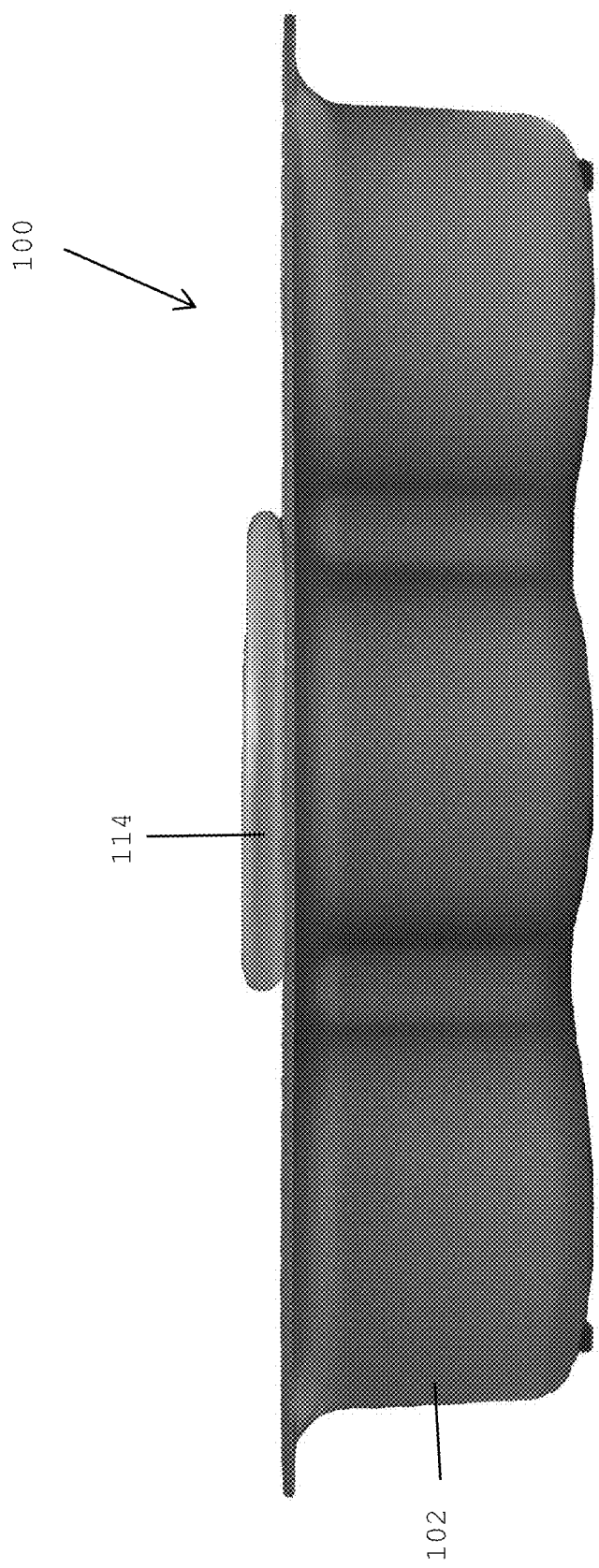
FIG. 2 is a side view of the cupcake/muffin pan according to one embodiment of the pans disclosed herein.

A cupcake/muffin pan is provided that, among other things, allows users to remove the completed cupcakes more easily that with traditional cupcake/muffin pans. Referring to FIG. 1, the cupcake/muffin pan 100 includes a first portion 102 and a second portion 104. The first portion 102 represents the form for at least half of the sides of the cupcake/muffin, and the second portion 104 represents the form for the rest of the sides and the bottom of the cupcake/muffin. The pan 100 is shown having a 2×3 "cups", but may be in any 2×N arrangement, where N is a whole number 1 or greater. In this regard, the pan 100 includes a plurality of corner cups 116 and, in certain embodiments, at least two interior cups 118.

Figure 5:
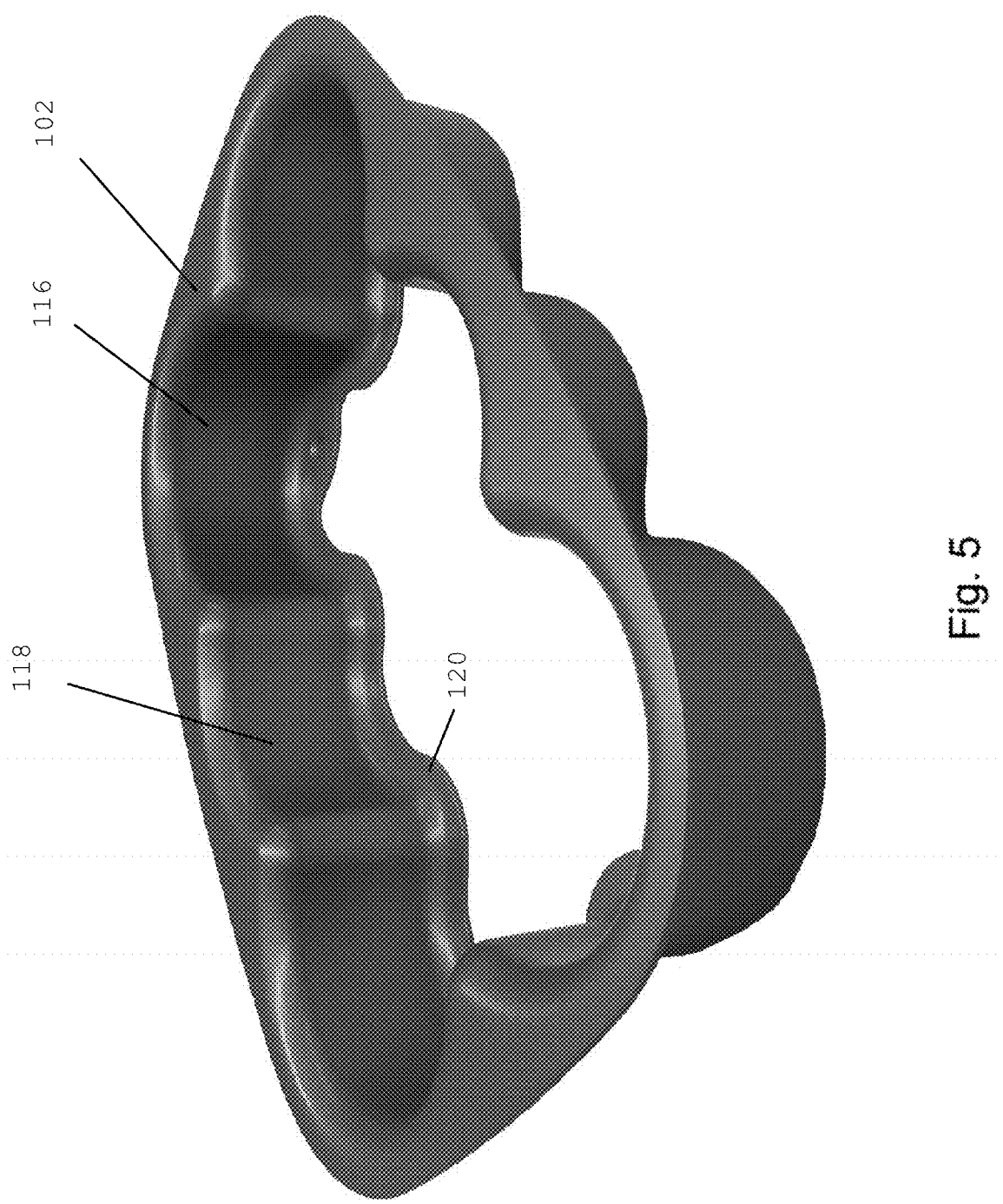
FIG. 5 is a perspective view of a portion of the cupcake/muffin pan according to one embodiment of the pans disclosed herein.
Figure 6:
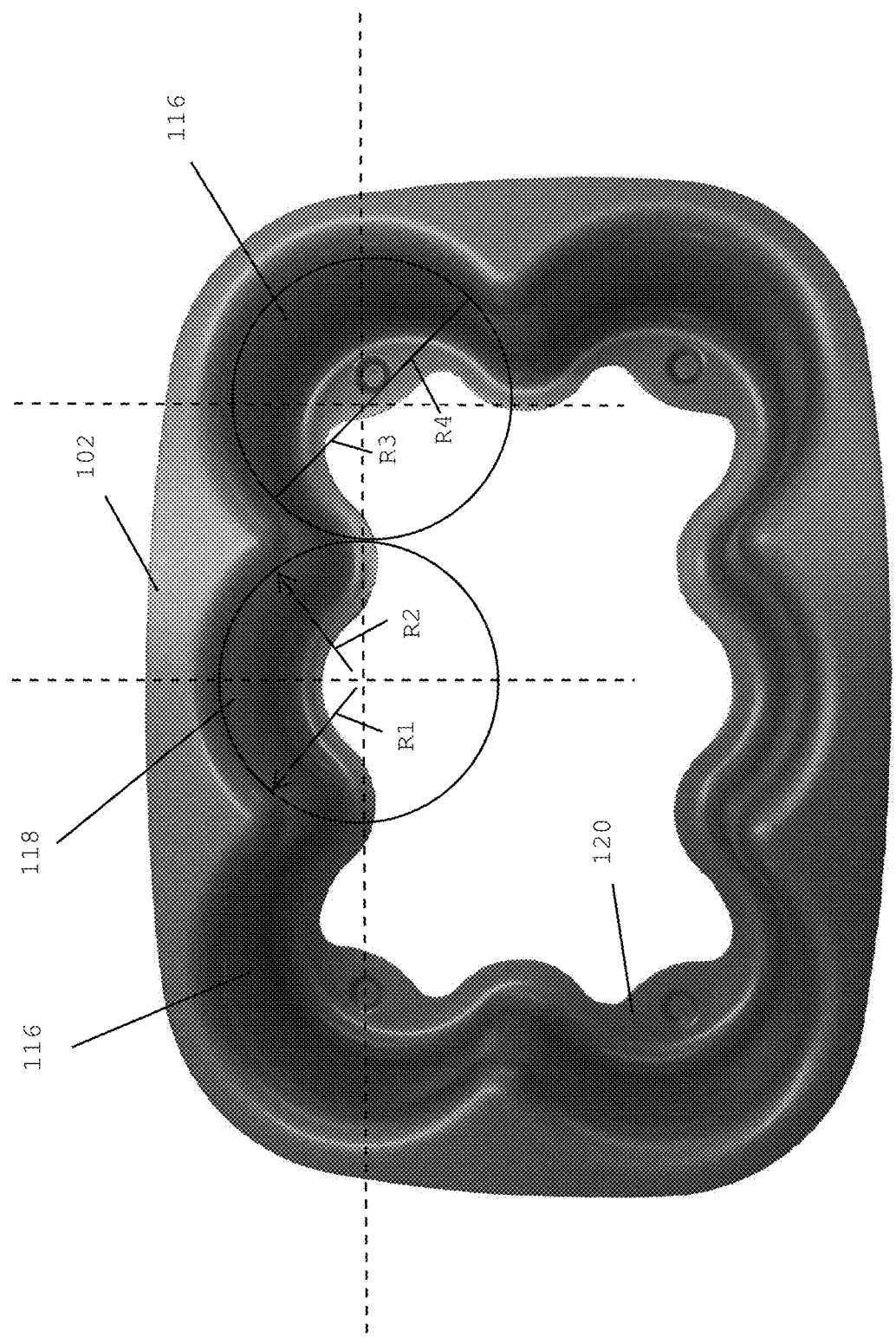
FIG. 6 is a top view of the portion of the cupcake/muffin pan according to one embodiment of the pans disclosed herein.

Referring to FIGS. 5-6, the first portion 102 may be made of a sheet of material formed (e.g., aluminum stamped) to represent the form for at least half of the sidewalls of the cupcake/muffin cups to be produced therewith. More specifically, as shown in FIG. 6, the perimeter of the walls of the first portion 102 include a first curved section representing a first corner cup 116, followed by a second curved section representing an interior cup 118, and finally by a third curved section representing second corner cup 116. The opposite walls of the first portion 102 is a mirror image thereof, as can be seen in FIG. 6. As can also be seen, the angle between radii R3 and R4 is about 180 degrees, whereas the angle between radii R1 and R2 is about 90 degrees, which is common among the corner and interior cups, respectively. In other words, the at least about half of the wall of the corner cupcake/muffin is formed with the first portion 102, whereas only about a quarter of the wall of the interior cupcake/muffin is formed by the first portion 102. Finally, the floor of the first portion includes a flange 120 on which the second portion 104 rests for baking. The bottom of the first portion 102 is shown open, but may also be continuous to prevent batter from leaking out of the bottom of the pan 100. Importantly, the transition between the wall of the cups 116, 118 and flange 120 has a curve thereto, e.g., of about 0.25 to about 0.75 inches, to facilitate removal of the cooked food items therefrom, as shown in FIG. 5.

Figure 3:
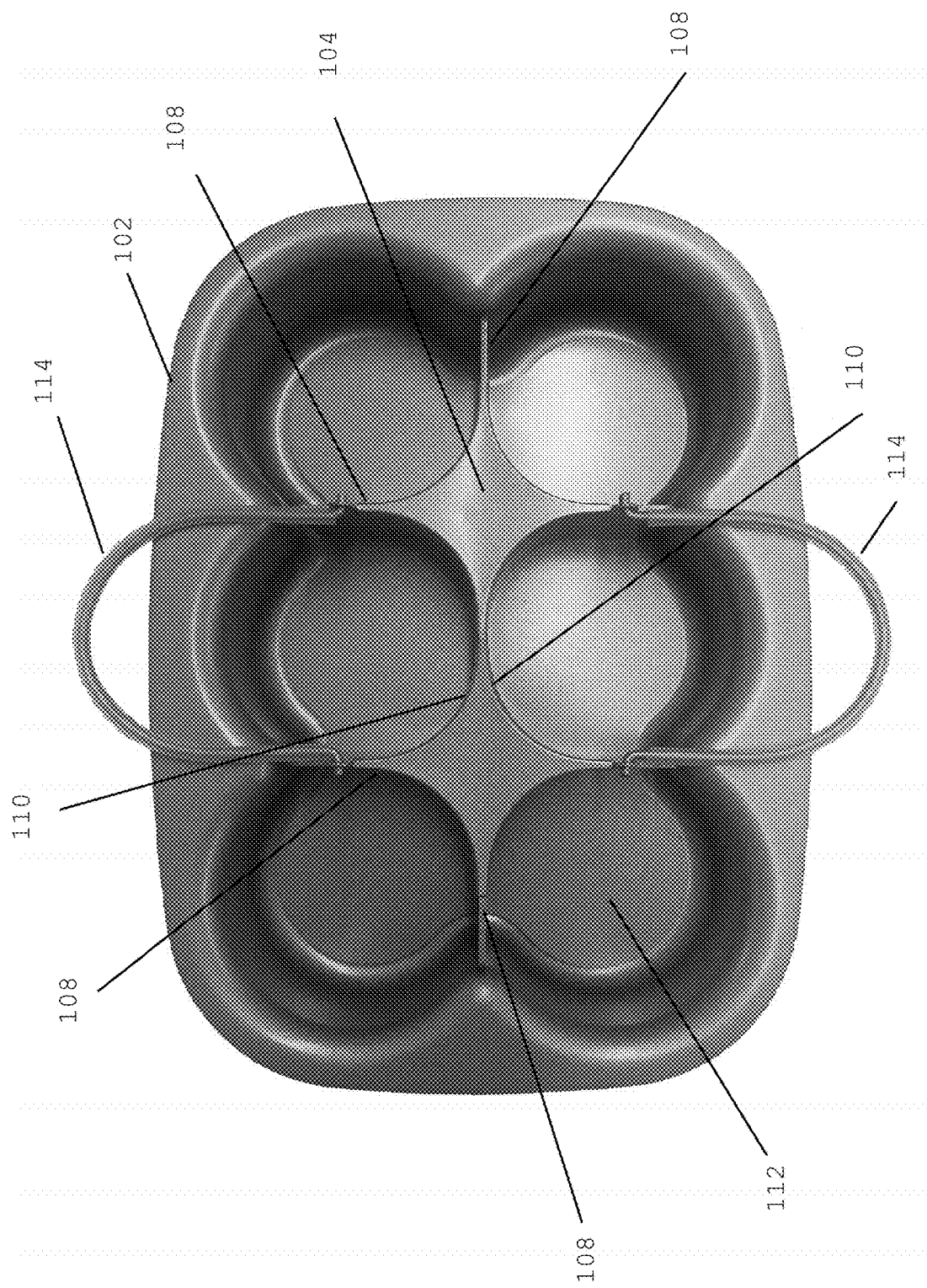
FIG. 3 is a top view of the cupcake/muffin pan according to one embodiment of the pans disclosed herein
Figure 4:
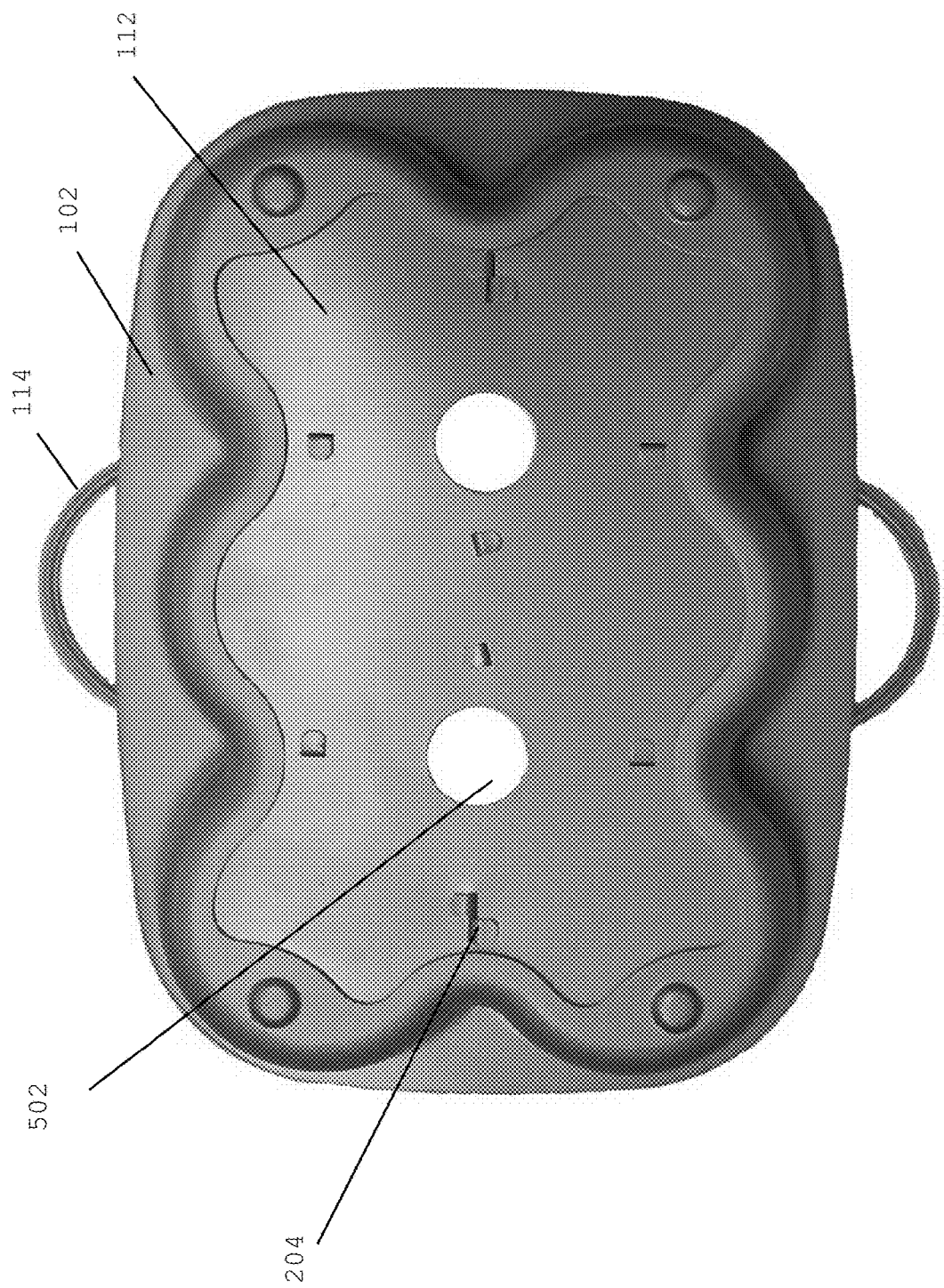
FIG. 4 is a bottom view of the cupcake/muffin pan according to one embodiment of the pans disclosed herein

Referring to FIGS. 1, 3 and 4, the construction of the second portion 104 is shown. In this embodiment, this portion 104 includes a continuous plate 112 that represents the form for the floor for all the cups 116, 118. As can be seen in FIG. 3, the plate 112 has a curved perimeter resembling closely the curvature of the exterior walls of the cups 116, 118. Referring to FIG. 1, extending from the plate 112, essentially orthogonally or preferably at a slight angle thereto, are a plurality of dividers 108, 110 that represent the form for the interior sidewalls of the cupcakes/muffins, i.e., the remaining sidewalls not formed by the first portion 102. In this regard, about half of the wall of the corner cupcake/muffin is formed with the second portion 104, whereas about three quarters of the wall of the interior cupcake/muffin is formed by the second portion 104. Finally, the top of the second portion 104 includes at least one cap 106. The cap 106 serves to close the opening that would otherwise be present. The second portion 104 may be formed from a single sheet or from multiple sheets of material, as shown. For instance, the curved interior walls 108, 110 may be made from separate sheets that are secured to each other at the tops via the cap 106 and to the plate 112 via tabs 204, as shown in FIG. 4. The plate 112 may also include a plurality of apertures 502 to facilitate constant temperatures for even baking. Referring to FIG. 3, the second portion 104 includes at least one handle 114 to facilitate lifting the second portion 104 away from the first portion 102. The handles 114 may further include a silicone or other coating to lessen the likelihood of burns in the event that a user attempts to separate the first and second portions from each other without sufficient cooling.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A baking pan forming a plurality of cups having sidewalls and bottoms, the baking pan comprising a first portion and a second portion separable from the first portion, wherein the first portion comprises at least half of the sidewalls of at least a first of the plurality of cups, and wherein the second portion comprises at least one cap, a plurality of dividers coupled to each other at tops thereof with the at least one cap, the plurality of dividers forming at least part of a remainder of the sidewalls of the first of the plurality of cups not formed by the first portion, and a plate that forms at least a bottom of the first of the plurality of cups, the plurality of dividers comprise a plurality of sheets of material extending outward from the plate that forms the bottom of the first of the plurality of cups, the plurality of sheets secured to each other at tops thereof with the at least one cap.

2. The baking pan of claim 1, wherein the pan forms at least 2×3 quantities of the plurality of cups.

3. The baking pan of claim 1, wherein the plurality of cups comprise a plurality of corner cups and a plurality of interior cups located between the plurality of corner cups.

4. The baking pan of claim 3, wherein the first portion includes a first curved section representing a sidewall of a first corner cup of the plurality of corner cups, followed by a second curved section representing a sidewall of a first interior cup of the plurality of interior cups, followed by a third curved section representing a sidewall of a second corner cup of the plurality of corner cups.

5. The baking pan of claim 4, wherein the first and third curved sections of the first portion each have a circular arc that measures 180 degrees.

6. The baking pan of claim 4, wherein the second curved section of the first portion has a circular arc that measures 90 degrees.

7. The baking pan of claim 4, wherein the first and third curved sections of the first portion comprise half of sidewalls of at least two of the plurality of cups, and wherein the second curved section of the first portion comprises a quarter of sidewalls of at least one of the plurality of cups.

8. The baking pan of claim 1, wherein the first portion includes a flange on which the second portion rests for baking.

9. The baking pan of claim 8, further comprising a curved transition between sidewalls the first portion and the flange of the first portion.

10. The baking pan of claim 1, wherein half of sidewalls of corner cups of the plurality of cups are formed with the second portion, and wherein three quarters of sidewalls of interior cups of the plurality of cups are formed by the second portion.

11. The baking pan of claim 1, wherein the second portion comprises the at least one cap that closes tops of the plurality of dividers.

12. The baking pan of claim 1, wherein the plate has therein an aperture at a location of at least one of the plurality of dividers.

13. A baking pan, forming a plurality of cups having sidewalls and bottoms, the baking pan comprising a first portion and a second portion separable from the first portion, wherein the first portion comprises a first curved section representing a sidewall of a first corner cup of the plurality of cups, followed by a second curved section representing a sidewall of a first interior cup of the plurality of cups, followed by a third curved section representing a sidewall of a second corner cup of the plurality of cups, wherein the first and third curved sections of the first portion comprise at least half of the sidewalls of at least two of the plurality of cups, and wherein the second portion comprises at least one cap, a plate that forms the bottoms of the plurality of cups, and a plurality of dividers secured to each other at tops thereof with the at least one cap, and wherein the plurality of dividers form a remainder of the sidewalls of the plurality of cups not formed by the first portion and comprise a plurality of sheets of material extending outward from the plate that forms the bottoms of the plurality of cups.

14. The baking pan of claim 13, wherein three quarters of sidewalls of the interior cups of the plurality of cups are formed by the second portion.

15. The baking pan of claim 13, wherein the plate has therein an aperture at a location of at least one of the plurality of dividers.

* * * * *